United States Patent
Wang

(10) Patent No.: US 8,435,616 B2
(45) Date of Patent: May 7, 2013

(54) SKIDPROOF MAT AND MANUFACTURING METHOD THEREOF AND SKIDPROOF MAT ASSEMBLY

(76) Inventor: Guanghe Wang, Shenzhen (CN)

( * ) Notice: Subject to any disclaimer, the term of this patent is extended or adjusted under 35 U.S.C. 154(b) by 788 days.

(21) Appl. No.: 12/471,890

(22) Filed: May 26, 2009

(65) Prior Publication Data

US 2009/0246432 A1    Oct. 1, 2009

Related U.S. Application Data

(63) Continuation-in-part of application No. 11/395,726, filed on Mar. 31, 2006, now abandoned.

(30) Foreign Application Priority Data

Apr. 1, 2005  (CN) .................. 2005 2 0056309 U

(51) Int. Cl.
  *B32B 33/00*  (2006.01)
  *B32B 9/00*   (2006.01)
  *B32B 25/02*  (2006.01)

(52) U.S. Cl.
  USPC ........ 428/41.7; 428/295.1; 428/202; 428/203

(58) Field of Classification Search ............... 428/295.1, 428/297.4, 40.1, 41.7, 202, 203, 411.1
  See application file for complete search history.

(56) References Cited

U.S. PATENT DOCUMENTS

| | | | |
|---|---|---|---|
| 5,935,676 A * | 8/1999 | Merriman et al. | 428/77 |
| 6,022,617 A * | 2/2000 | Calkins | 428/354 |
| 6,184,496 B1 * | 2/2001 | Pearce | 219/213 |
| 6,187,865 B1 * | 2/2001 | Brodeur, Jr. | 525/191 |
| 6,221,796 B1 * | 4/2001 | Hawley et al. | 442/43 |
| 6,673,409 B1 * | 1/2004 | Wheatley | 428/40.1 |
| 6,911,406 B2 * | 6/2005 | Sobonya et al. | 442/43 |
| 6,921,579 B2 * | 7/2005 | O'Shaughnessy et al. | 428/432 |
| 7,125,602 B2 * | 10/2006 | Wheatley | 428/156 |
| 7,252,867 B2 * | 8/2007 | Wheatley | 428/40.1 |
| 7,253,126 B2 * | 8/2007 | Browne | 442/2 |
| 7,323,239 B2 * | 1/2008 | Vanderstappen et al. | 428/216 |
| 7,399,201 B1 * | 7/2008 | Khorsand | 439/501 |
| 7,491,439 B2 * | 2/2009 | Price | 428/316.6 |
| 7,524,778 B2 * | 4/2009 | Sobonya et al. | 442/2 |
| 7,601,653 B2 * | 10/2009 | Price | 442/2 |

(Continued)

FOREIGN PATENT DOCUMENTS

CN    200967318 Y  * 10/2007
CN    101070396 A  * 11/2007

(Continued)

*Primary Examiner* — Cheryl Juska
(74) *Attorney, Agent, or Firm* — Zhigang Ma

(57) ABSTRACT

A skidproof mat is provided which comprises: a rubber layer having a first major surface and a second major surface being opposite to the first major surface, and a thickness defined between the first and second major surfaces; a base layer; and a protection film covering each of the first and second major surfaces of the rubber layer; wherein the base layer is disposed within the thickness of the rubber layer so that the first and second major surfaces of the rubber layer constitute major outer surfaces of the skidproof mat. The protection film is movable when using. The rubber layer can achieve perfect anti-slip effect. The base layer is positioned in the rubber layer to increase the tenacity so that the skidproof mat is impossible to be deformed and has well ageing resistance.

14 Claims, 3 Drawing Sheets

U.S. PATENT DOCUMENTS

| | | | |
|---|---|---|---|
| 7,625,625 B2 * | 12/2009 | Rios et al. | 428/141 |
| 7,800,903 B2 * | 9/2010 | Wang | 361/695 |
| 7,910,188 B2 * | 3/2011 | Wheatley | 428/40.1 |
| 7,923,088 B2 * | 4/2011 | Wheatley | 428/40.1 |
| 8,110,269 B2 * | 2/2012 | Wheatley | 428/40.1 |
| 8,110,270 B2 * | 2/2012 | Wheatley | 428/40.1 |
| 2003/0036323 A1 * | 2/2003 | Aliabadi | 442/40 |
| 2003/0152761 A1 * | 8/2003 | McCune | 428/319.3 |
| 2004/0038607 A1 * | 2/2004 | Williamson et al. | 442/101 |
| 2004/0115446 A1 | 6/2004 | Dalmais et al. | |
| 2004/0244314 A1 | 12/2004 | Lieber | |
| 2005/0255767 A1 | 11/2005 | Flint et al. | |
| 2009/0194660 A1 * | 8/2009 | Wu | 248/346.03 |
| 2009/0221333 A1 * | 9/2009 | Harvey | 455/575.1 |
| 2011/0296727 A1 * | 12/2011 | Savagian et al. | 40/594 |

FOREIGN PATENT DOCUMENTS

| | | | |
|---|---|---|---|
| CN | 101676327 A | * | 3/2010 |
| CN | 201829974 U | * | 5/2011 |
| CN | 102134365 A | * | 7/2011 |
| CN | 102161811 A | * | 8/2011 |
| CN | 202024042 U | * | 11/2011 |
| FR | 2545415 A | * | 11/1984 |
| FR | 2933801 A1 | * | 1/2010 |
| JP | 2007210168 A | * | 8/2007 |
| JP | 2009039374 A | * | 2/2009 |
| KR | 2012005081 U | * | 7/2012 |

* cited by examiner

SKIDPROOF MAT AND MANUFACTURING METHOD THEREOF AND SKIDPROOF MAT ASSEMBLY

FIELD

The present invention relates to a skidproof mat, and more especially to a skidproof mat used under wildly rocking environment.

BACKGROUND

Known skidproof mats are normally used in daily house life and under wildly rocking environment such as vehicles, ship, trains and airplanes. A published Chinese utility model patent with the Pat. No. ZL 99251268.9 discloses a skidproof mat applied in daily house life which is available on a smooth floor or a surface of a bathtub to prevent people from slipping. The objects placed in a relatively wobbling environment also require a skidproof mat to remain stability. For example, a mobile phone, a key or a perfume bottle arranged on an instrument table of a car without the skidproof mat is unable to ensure steady just like jamming the brakes on or having a bumpy ride. Moreover, the skidproof mat above-mentioned generally has a drawback of poor surface viscosity, so it is not available under wildly rocking environment.

Recently a kind of skidproof mat made of thermoplastic elastic materials like TPR (thermo plastic rubber) or TPE (thermo plastic elastomer) appears. TPR and TPE have a variety of polymers and performance of different kinds of TPR and TPE depend on their components and related additives. Generally, it is difficult to print patterns or trademarks, even other individual information such as advertisements thereon, resulting in failing to meet actual requirements of clients. In addition, this skidproof mat is prong to be deformed for the reason of its softy property.

SUMMARY

In accordance with an aspect of the present invention, a skidproof mat is provided, which can be used under wildly rocking environment. The skidproof mat includes a rubber layer having a first major surface and a second major surface being opposite to the first major surface, and a thickness defined between the first and second major surfaces; a base layer; and a protection film covering each of the first and second major surfaces of the rubber layer; wherein the base layer is disposed within the thickness of the rubber layer so that the first and second major surfaces of the rubber layer constitute major outer surfaces of the skidproof mat. The protection film is movable when using.

In accordance with another aspect of the present invention, a manufacturing method of the skidproof mat, which is used under wildly rocking environment, is provided. The manufacturing method includes the steps of:

providing a base layer; forming a rubber layer on both surfaces of the base layer separately, the rubber layer having a first major surface and a second major surface being opposite to the first major surface, and a thickness defined between the first and second major surfaces, the first and second major surfaces of the rubber layers layer constituting major outer surfaces of the skidproof mat; and covering each outer surface of the rubber layer with a protection film, the protection film being configured for protecting the rubber layer and being movable when using.

In accordance with still another aspect of the present invention, a skidproof mat assembly is provided. The skidproof mat assembly comprises at least two skidproof mats, each skidproof mat comprising: a rubber layer having a first major surface and a second major surface being opposite to the first major surface, and a thickness defined between the first and second major surfaces; a base layer; and a protection film covering each of the first and second major surfaces of the rubber layer. The base layer is disposed within the thickness of the rubber layer so that the first and second major surfaces of the rubber layer constitute major outer surfaces of the skidproof mat, the protection film being movable when using. The at least two skidproof mats are configured for receiving, supporting, or laying articles thereon.

In accordance with the present invention, the rubber layer is made of thermoplastic elastic materials such as thermo plastic rubber and thermo plastic elastomer, which ensures perfect anti-slip effect and can absorb impact or shock. The base layer is positioned in the rubber layer to increase the tenacity so that the skidproof mat is impossible to be deformed and has well ageing resistance. In addition it is convenient to print various required patterns on the base layer. The protection film can provide a good protection for the rubber layer and can be moved when using.

Other objects, advantages and novel features of the present invention will become more apparent from the following detailed description when taken in conjunction with the accompanying drawings.

DRAWINGS

DETAILED DESCRIPTION

Figure 1:
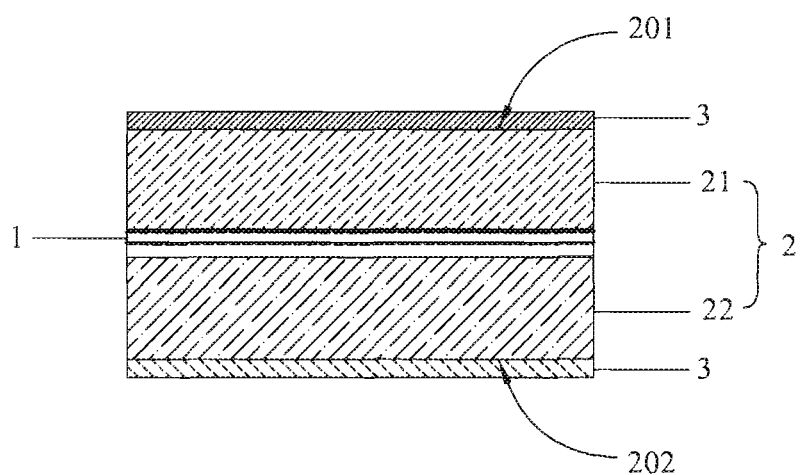
FIG. 1 is a longitudinal cross-sectional view of the skidproof mat in accordance with an embodiment of the present invention.

Referring to FIG. 1, a skidproof mat 10 according to an embodiment of the present invention includes a base layer 1 and a rubber layer 2. The base layer 1 is disposed in the rubber layer 2. The base layer 1 is formed in a shape of fiber clothes, wire meshes, plastic films, metal foils or screens. The base layer 1 is advantageously a polypropylene (PP) film, a poly ethylene terephthalate (PET) film, a nylon screen or a perforated copper mesh, etc. The base layer 1 is advantageously provided with pattern, color or texture. The rubber layer 2 is made of thermoplastic elastic materials for instance, thermo plastic rubber or thermo plastic elastomer. The rubber layer 2 is distributed evenly on a top and bottom surface of the base layer 1 after melted by high temperature. The rubber layer 2 includes a first rubber layer 21 and a second rubber layer 22. The base layer 1 is sandwiched between the first and the second rubber layers 21 and 22. The rubber layer 2 has a first major surface 201 of the first rubber layer 21 and a second major surface 202 being opposite to the first major surface 201 of the second rubber layer 22. A thickness is defined between the first and second major surfaces 201 and 202.

TPR or TPE has good elasticity, high intensity and perfect viscosity, so it can provide excellent anti-slip and anti-shock performance. It is also easy to be machined as various shapes to satisfy actual requirements of people. The skidproof mat 10, in accordance with the embodiment of the present invention, defines the base layer 1 in the rubber layer 2, which increases the tenacity of the skidproof mat having such structure. Thus, the skidproof mat is impossible to be deformed and has well ageing resistance. Additionally, it is convenient to print various required patterns on the base layer 1 and it is also advantageous if change the patterns. As a result, this skidproof mat has high utility in actual manufacture. The rubber layer 2 comprises a matrix material having one of SBS and SEBS, filling oil, ethylene vinyl acetate, plasticizing agent, antioxidant, light stabilizer and UV stabilizer.

In a preferred embodiment, the rubber layer 2 mainly includes the following components with their different parts by weight: styrene-butadiene-styrene (SBS) or styrene-ethylene-butylene-styrene (SEBS) as a matrix material (for example G serials or D serials from American Kratn company, or YH serial from Petrochina Yueyang Baling Huaxin Limited), about 100 parts by weight; filling oil (for example cycloparaffin oil of KNH serials or NK serials from Petrochina Karamay Petrochemical Company), about 100-300 parts by weight; non-pollution antioxidant (Antioxidant 264 or Antioxidant 1010), about 1-10 parts by weight; and UV stabilizer, about 1-5 parts by weight. According to the above mixture ratios of these components, the rubber layer 2 achieves a hardness of Shore A between about 0 degree to about 50 degrees and an adhesive strength of about 0.2 N/cm to about 0.8 N/cm. Such performance concerning hardness and adhesive strength of the rubber layer 2 is benefit for adhering and supporting object thereon. Advantageously, the rubber layer 2 further includes the following components: plasticizing agent (e.g., paraffin or low polymer PE), about 10-50 parts by weight; polypropylene resin, about 20-50 parts by weight; ethylene vinyl acetate (EVA), about 10-50 parts by weight; light stabilizer, about 1-5 parts by weight; and filling material (e.g., calcium carbonate or ultra-fine silica powder), about 0-100 parts by weight.

Additionally, the rubber layer 2 further comprises other additives, such as for example, air freshener, environmentally-friendly pigment, luminescence pigment, fluorescence pigment, thermochromic pigment, aromatic agent, inorganic filler, as well as colorant or base tinter, or toner. These additives can be optionally used according to actual demands. The viscosity (i.e., adhesive strength) and hardness of the skidproof mat 10 depend on the filling volume of the filling oil. The filling oil is mainly used for improving the viscosity of the skidproof mat 10. It is also to be noted that too high volume of filling oil renders the skidproof mat 10 to sweat out oil. Due to use of the filling oil, the skidproof mat 10 is free of tackifying resin. In this structure, dust or dirt adsorbed on the surface of the skidproof mat 10 can be easily removed by cleaning during using without changing the quality of the skidproof mat 10. Thus, the skidproof mat 10 can be reused for a very long time by cleaning. The addition of the polypropylene resin can increase temperature resistance and hardness of the product, and the EVA can provide the product with better ozone resistance and solvent resistance.

The rubber layer 2 has a thickness of about 0.5 millimeters to about 5 millimeters. The rubber layer 2 has a hardness of Shore A between about 0 degree to about 50 degrees and an adhesive strength of about 0.2 N/cm to about 0.8 N/cm. The rubber layer 2 may be transparent, translucent or opaque, or may be colored. The rubber layer 2 has a smooth outer surface, or is provided with cloth marks, stripes, or patterns. The thickness, hardness, adhesive strength and color of the first and second rubber layers 21 and 22 may be the same or different.

Furthermore, the rubber layer 2 is prone to be polluted since it has high viscosity. So the skidproof mat 10 in accordance with the present invention further includes a protection film 3 covering the rubber layer 2, for decreasing pollution during manufacture process and ensuring perfect performance of products. The outer surface (i.e., the first and second major surfaces 201 and 202) of the first and second rubber layers 21 and 22 respectively are covered with one protection film 3. The protection film 3 is advantageously a plastic film or a paper made of PET, PP or polyethylene (PE). The protection films 3 on the first and second rubber layers 21 and 22 can be provided with the same or different material or color. For example, when the skidproof mat 10 utilizes a polyester film as the base layer 1 and a single surface thereof is printed with pattern, in order to facilitate light transmission and coiling of product, a flexible transparent PE film is advantageously formed on the surface with pattern and a paper or transuler plastic film may be applied to the opposite surface relative to the patterned surface.

Once put into use, the protection film 3 is removed for exposing the rubber layer 2 outside to hold articles using the perfect viscosity of the rubber layer 2. The rubber layer 2 has a good anti-skid performance and can fix articles even under wildly rocking environment. Each protection film 3 is advantageously provided with a release agent at a surface thereof contacting the rubber layer 2, for facilitating removal of the protection film 3 from the rubber layer 2. The release agent could be silicone oil.

Figure 2:
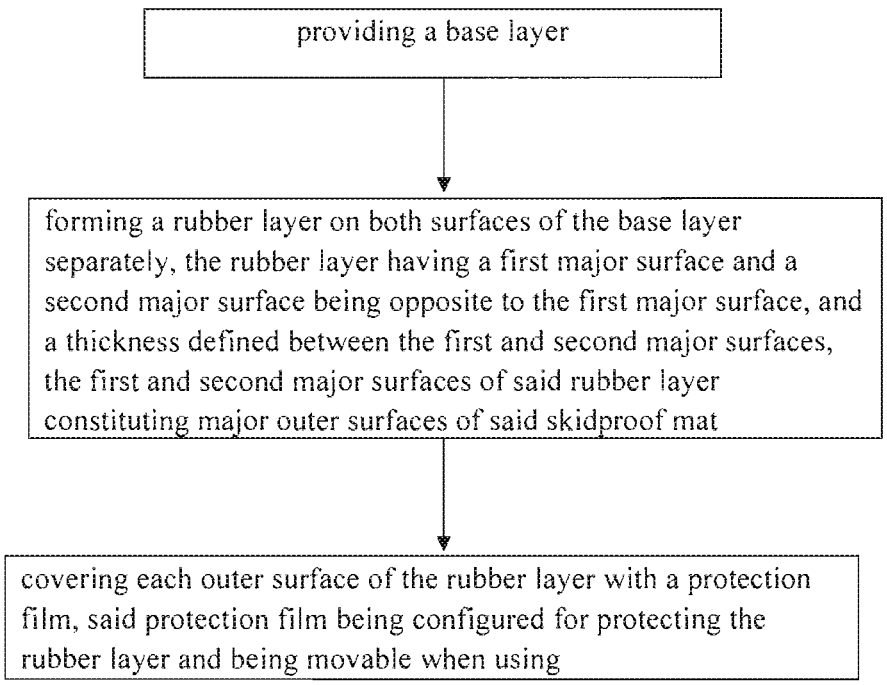
FIG. 2 is a flow chart of a manufacturing method of the skidproof mat of FIG. 1.

Referring to FIG. 2 together with FIG. 1, a manufacturing method of the skidproof mat 10 includes the steps of:

providing a base layer 1;

forming the rubber layer 2 above described on both surfaces of the base layer separately. The rubber layer 2 has the first major surface 201 and the second major surface 202 being opposite to the first major surface 201. A thickness is defined between the first and second major surfaces 201 and 202. The first and second major surfaces 201 and 202 of the rubber layers constitutes major outer surfaces of the skidproof mat; and covering each outer surface of the rubber layer with a protection film, the protection film being configured for protecting the rubber layer and being movable when using.

The base layer 1 includes material and components described above. Before formation of the rubber layer 2 on the base layer 1, the base layer 1 is pretreated using treatment methods selected from the group consisting of: corona treatment, chemical modification, surface modification, flame or heat treatment, plasma treatment, and so on. The pretreatment is used for enhancing adhesion between the base layer 1 and the rubber layer 2 and is helpful to print various patterns on the base layer 1 according to demands. Taking PP film as an example, the rubber layer 1 is treated by an air corona discharge (or $N_2$ corona discharge) to activate molecules at surface of the base layer 1, and polarize the molecules. Then, the surface of the base layer 1 is modified by using coupling agent such as aluminum zirconium coupling agent. In this case, the adhesion of the PP film with various kinds of TPR or TPE materials is improved and various desired patterns can be effectively printed.

The rubber layer 2 is formed on the base layer 1 by a heat sealing coating process or a solvent coating process. In the heat sealing coating process, a screw extruder and a high temperature oven is utilized to melt the rubber raw material. Then the melten rubber (i.e., TPR or TPE) is coated on the base layer 1: Specifically, the heat sealing coating process includes the steps as follows: admixing the raw materials of desired compositions, e.g., several components which constitute the rubber layer 2 mentioned above, in a high-speed mixer; coating the admixed resultant on the pretreated PET film with patterns by a molding screw extruder at a high temperature of about 180° C.-230° C.; embossing the surface of the rubber layer using a positive roller or a negative roller having a cooling function; quickly cooling the rubber layer. After cooling, the protection films 3 are respectively formed on the first and second rubber layer 21 and 22. The quickly cooling is advantageous to reduce warpage resulting from embossing or laminating process.

In the solvent coating process, the raw materials for the rubber layer 2 are dissolved in a solvent, then the dissolved materials are coated on surfaces of the base layer 1. After drying and solidifying, the skidproof mat 10 is thereby formed. Specifically, the solvent coating process includes the steps as follows: admixing the raw materials for the rubber layer 2 in a mixer; dissolving the admixed materials using a composite solution composed of solvent gasoline and cyclohexane (mixture ratio, 1:2 by volume); regulating weight of solid part between 20%-30%; coating the dissolved materials on the base layer 1 by a knife coater and then drying it. This process is usefully used for forming the skidproof mat with a thickness of below about 1.5 mm. The solvent could be selected from the group consisting of: solvent gasoline, cyclohexane, benzene, toluene, methyl ethyl ketone, aether or any combination thereof.

The skidproof mat 10, which is manufactured by the heat sealing coating process or the solvent coating process, can achieve a hardness of Shore A between about 0 degree to about 50 degrees and an adhesive strength of about 0.2 N/cm to about 0.8 N/cm according to various mixture ratios of raw materials.

In use, at least two skidproof mats 10 may be combined to form a skidproof mat assembly. The at least two skidproof mats 10 are configured (i.e., structured, arranged or adapted) for receiving, supporting, or laying desired articles thereon according to actual requirements.

Figure 3:
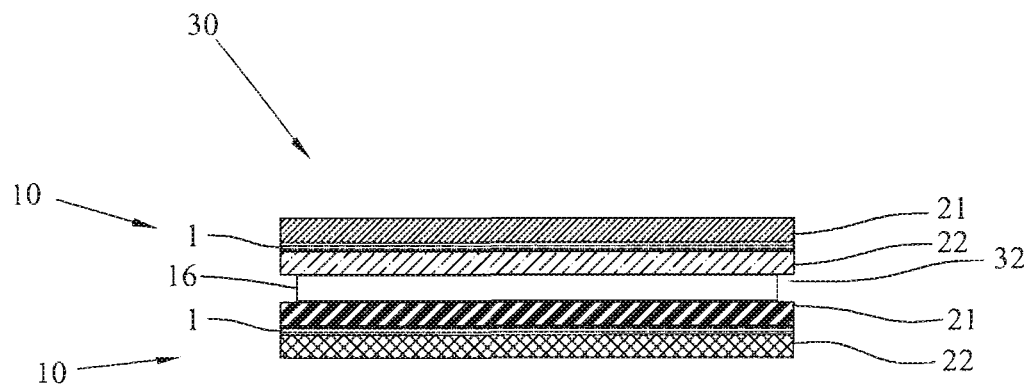
FIG. 3 is a longitudinal cross-sectional view of an exemplary skidproof mat assembly using the skidproof mat of FIG. 1.
Figure 4:
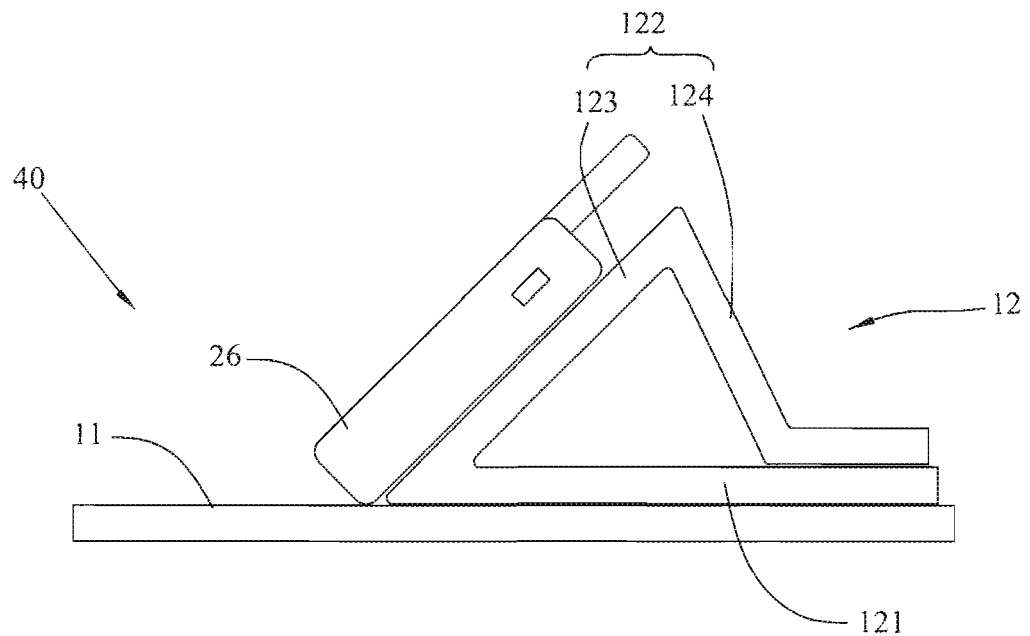
FIG. 4 is a longitudinal cross-sectional view of another exemplary skidproof mat assembly using the skidproof mat of FIG. 1.

Referring to FIG. 3, a skidproof mat assembly 30 including two skidproof mats 10 is shown. In the illustrated embodiment, the two skidproof mats 10 are stacked up to form at least one interspace 32 defined between the opposite rubber layers (e.g., the second rubber layer 22 of an upper skidproof mat 10 and the first rubber layer 21 of another lower skidproof mat 10) facing each other, for receiving articles 16 therein. The protection films 3 on the second rubber layer 22 of an upper skidproof mat 10 and the first rubber layer 21 of another lower skidproof mat 10 are removed. The protection films 3 on the first rubber layer 21 of an upper skidproof mat 10 and the second rubber layer 22 of another lower skidproof mat 10 can be remained to prevent the external rubber layer from pollution, or is removed to fix the assembly 30 to a table or the likes or fix other articles at the exposed upper surface of the first rubber layer 21 (as shown in FIG. 4). The available articles include photos, pictures, plastic ornaments, hardware ornaments, and so on. Advantageously, at least one skidproof mat 10 is made of a clear material with a light transmittance above 80% so that the articles 16 are visible through the clear skidproof mat 10. The adhesion performance of the rubber layer 2 can almost be unchanged even thought the mat 10 is used for a long period. Further, the rubber layer 2 can be repeatedly used to fix articles 16 without fatigue and aging by its adhesion. The articles 16 can be readily replaced even if they are used for a long period due to the adhesive strength of below 0.8 N/cm.

Referring to FIG. 4, another skidproof mat assembly 40 including two skidproof mats is shown. In the illustrated embodiment, the two skidproof mats includes a first skidproof mat 11 and a second skidproof mat 12. The base layer 1 of the second skidproof mat 12 is made of a rigid material, for example, metal meshes or metal foils. The second skidproof mat 12 comprises a first portion 121 and a second portion 122. The first portion 121 is bonded to the first skidproof mat 11 and the second portion 122 is folded to be a rest for laying, supporting or receiving articles 26 thereon. For example, as shown in FIG. 4, the rest is an angular backrest. The angular second portion 122 includes a slope 123 and a back portion 124 adjourning the slope 123 at an angle (e.g., about 30 degrees to about 60 degrees). The slope 123 is inclined to the first portion 121 at an angle (e.g., about 10 degrees to about 75 degrees). The back portion 124 further is folded at its free end to be bonded to the first portion 121. In use, the articles 26 lay against the slope 123, as shown in FIG. 4. Other articles could be optionally supported on the back portion 124. The available articles 16 could be, for example, mobile phones or global positioning system (GPS) navigators. It is to be noted that the second skidproof mat 122 could be configured to be other supporting or receiving structures than the angular backrest according to actual requirements.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

The invention claimed is:

1. A skidproof mat for holding articles thereon, comprising: a rubber layer having a first major surface and a second major surface being spaced from and opposite to the first major surface, a base layer, and a removable protection film covering each of the first and second major surfaces of said rubber layer; wherein said base layer is disposed between the first and second major surfaces of said rubber layer and the first and the second major surfaces constitute two major outer surfaces of said skidproof mat; when one of the protection films is removed, one of the two major outer surfaces of the rubber layer covered by the protection film is exposed to hold the articles via viscosity of the rubber layer; and the rubber layer comprises the following components with their different parts by weight:

styrene-butadiene-styrene or styrene-ethylene-butylene-styrene as a matrix material, about 100 parts;
filling oil, about 100-300 parts;
non-pollution antioxidant, about 1-10 parts; and
UV stabilizer, about 1-5 parts.

2. The skidproof mat as claimed in claim 1, wherein said base layer is made of fiber cloths, wire meshes, plastic films, metal foils or screens.

3. The skidproof mat as claimed in claim 1, wherein said rubber layer further comprises additives selected from the group consisting of: air freshener, environmentally-friendly pigment, luminescence pigment, fluorescence pigment, thermochromic pigment, aromatic agent and inorganic filler.

4. The skidproof mat as claimed in claim 1, wherein said rubber layer has a thickness of about 0.5 millimeters to about 5 millimeters.

5. The skidproof mat as claimed in claim 1, wherein said rubber layer has a hardness of Shore A between about 0 degree to about 50 degrees and an adhesive strength of about 0.2 N/cm to about 0.8 N/cm.

6. The skidproof mat as claimed in claim 1, wherein said rubber layer is transparent, translucent or opaque, or is colored.

7. The skidproof mat as claimed in claim 1, wherein said rubber layer has a smooth outer surface or is provided with cloth marks, stripes, or patterns.

8. The skidproof mat as claimed in claim 1, wherein said rubber layer comprises a first rubber layer and a second rubber layer, said base layer being sandwiched between the first and second rubber layers, thickness, hardness, adhesive strength and color of the first and second rubber layers being the same or different.

9. The skidproof mat as claimed in claim 1, wherein the protection film is a plastic film or a paper made of poly ethylene terephthalate, polypropylene, or polyethylene.

10. The skidproof mat as claimed in claim 1, wherein both outer surfaces of said rubber layer are covered with protection films respectively, material and color of the protection films are the same or different.

11. The skidproof mat as claimed in claim 1, wherein the protection film is provided with a release agent at a surface thereof contacting the rubber layer.

12. The skidproof mat as claimed in claim 1, wherein the base layer is provided with pattern, color or texture.

13. The skidproof mat as claimed in claim 1, wherein the rubber layer further comprises the following components with their different parts by weight:
plasticizing agent, about 10-50 parts;
polypropylene resin, about 20-50 parts;
ethylene vinyl acetate, about 10-50 parts;
light stabilizer, about 1-5 parts; and
filling material, about 0-100 parts.

14. The skidproof mat as claimed in claim 1, wherein the filling oil is cycloparaffin oil.

\* \* \* \* \*